Patented Jan. 6, 1953

2,624,706

UNITED STATES PATENT OFFICE 2,624,706

NONCORROSIVE FIRE EXTINGUISHING COMPOSITION

William J. Maxcy, Easton, Pa., and Herbert L. Sanders, Phillipsburg, N. J., assignors to General Aniline & Film Corporation, New York, N. Y., a corporation of Delaware No Drawing. Application October 23, 1948, Serial No. 56,264

2 Claims. (Cl. 252—2)

1

The present invention relates to corrosion resistant fire-extinguishing compositions and more particularly to corrosion resistant fire extinguishing compositions containing a specific type of wetting agent.

In extinguishing fires, it has been found that the effectiveness of water may be substantially extended by the use of a wetting agent. This apparently allows the water to spread over a greater surface and come into a more intimate contact with the burning material. A number of wetting agents have been used, but alkylated phenol-ethylene oxide wetting agents have been found to be particularly effective. These agents, however, have a tendency to cause corrosiveness on iron or steel or the like with which they may come in contact. In practice, the wetting agent is sold in the form of a concentrated stock solution which is extensively diluted for extinguishing fires. Because of this dilution, the ordinary corrosion inhibitors were not effective since they would be in too high concentration in the stock solution and, perhaps, even accelerate corrosion with the stock solution as well as preventing mutual solubility of the inhibitor and wetting agent, or they are too expensive.

It is, therefore, an object of the present invention to produce a corrosion-resistant fire extinguishing composition containing an alkylated phenol-ethylene oxide wetting agent.

It is a further object of the present invention to produce a corrosion resistant concentrated solution of an alkylated phenol-ethylene oxide wetting agent and an anti-corrosion inhibitor which are mutually soluble in dilute solution and inexpensive.

These and other objects are attained by the present invention wherein there is provided a composition for extinguishing fires comprising an alkylated phenol-ethylene oxide wetting agent, sodium nitrite, and water.

By alkylated phenol-ethylene oxide wetting agent, it is meant the compound having the general formula:

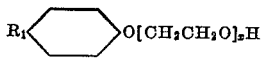

wherein $R_1$ is a member of the group consisting of alkyl and cyclo alkyl radicals of at least four carbon atoms and mixtures thereof, and $x$ stands for a figure of the group 6 to 25. There may be additional alkyl substituents on the aromatic ring. One such composition is 2-4 diamyl phenol poly glycol ether in which there are from 8 to 11 ethylene oxide molecules to each phenol molecule. The following is illustrative of corrosion tests on the indicated solutions.

(a) 20% 2-4 diamyl phenol poly glycol ether in water.

2

(b) 20% 2-4 diamyl phenol poly glycol ether in water plus 5% sodium nitrite.

(c) 0.2% 2-4 diamyl phenol poly glycol ether in water.

(d) 0.2% 2-4 diamyl phenol poly glycol ether in water plus 0.05% sodium nitrite.

Strips of steel were immersed in the solutions and in solutions b and d no signs of local corrosion or weight loss were exhibited after 22 days of immersion, whereas the strips in solutions a and c showed extreme corrosion and weight loss. Pieces of galvanized iron immersed in the same solutions were attacked severely in solutions a and c, but only slightly in solutions b and d.

It will be seen from these tests that the combination of the sodium nitrite with the polyglycol ether wetting agent was effective in reducing corrosion, that the ingredients were mutually soluble and do not react to accelerate corrosion.

The amounts of the wetting agent in the above compositions is more than would be used in actual practice for economical reasons. One tenth of one percent of the wetting agent in water is effective and lesser or greater amounts may be used. The amount of nitrite may be varied greatly but amounts from 1 to 10 parts per 10 parts of wetting agent have been found to be effective.

While we have been here primarily concerned with corrosion in fire extinguishing solutions, it will be obvious that the invention is not limited thereto and the wetting agent solution may be used as well for other wetting purposes and will not corrode containers or the like with which it may come in contact, such as for example, restaurant silverware, steel drums, etc.

We claim:

1. A corrosion resistant fire extinguishing solution consisting essentially of 10 parts of 2-4 diamyl phenol poly glycol ether wetting agent, 1 to 10 parts of sodium nitrite, and water.

2. A corrosion resistant fire extinguishing solution consisting essentially of water having dissolved therein from 1 to 10 parts of sodium nitrite per 10 parts of an alkylated phenol-ethylene oxide wetting agent.

WILLIAM J. MAXCY.
HERBERT L. SANDERS.

REFERENCES CITED

The following references are of record in the file of this patent:

UNITED STATES PATENTS

| Number | Name | Date |
|---|---|---|
| 2,213,477 | Steindorff et al. | Sept. 3, 1940 |
| 2,252,385 | Orozco | Aug. 12, 1941 |
| 2,365,619 | Bagley et al. | Dec. 19, 1944 |
| 2,506,062 | Busse et al. | May 2, 1950 |